US008690096B2

(12) United States Patent
Alvarez Calderon F.

(10) Patent No.: US 8,690,096 B2
(45) Date of Patent: Apr. 8, 2014

(54) AIRCRAFT WITH DUAL FLIGHT REGIMES

(75) Inventor: Alberto Alvarez Calderon F., La Jolla, CA (US)

(73) Assignee: Alberto Alvarez-Calderon F., La Jolla, CA (US)

( * ) Notice: Subject to any disclaimer, the term of this patent is extended or adjusted under 35 U.S.C. 154(b) by 151 days.

(21) Appl. No.: 12/802,104

(22) Filed: May 29, 2010

(65) Prior Publication Data

US 2011/0031355 A1    Feb. 10, 2011

Related U.S. Application Data

(60) Provisional application No. 61/217,997, filed on Jun. 4, 2009.

(51) Int. Cl.
*B64C 27/22*    (2006.01)

(52) U.S. Cl.
USPC ....... 244/6; 244/17.11; 244/17.21; 244/17.23

(58) Field of Classification Search
USPC ............. 244/7 A, 7 C, 8, 17.11, 17.21, 17.23, 244/17.25, 17.27, 45 R, 129.5, 132; 49/278
See application file for complete search history.

(56) References Cited

U.S. PATENT DOCUMENTS

| | | | | |
|---|---|---|---|---|
| 1,417,884 A | * | 5/1922 | Bernier | 244/6 |
| 3,064,928 A | * | 11/1962 | Toll | 244/46 |
| 3,149,800 A | * | 9/1964 | Sintes et al. | 244/7 R |
| 4,767,083 A | * | 8/1988 | Koenig et al. | 244/12.3 |
| 5,899,410 A | * | 5/1999 | Garrett | 244/45 R |
| 5,984,231 A | * | 11/1999 | Gerhardt et al. | 244/46 |
| 6,293,491 B1 | * | 9/2001 | Wobben | 244/17.23 |
| 7,198,225 B2 | * | 4/2007 | Lisoski et al. | 244/55 |
| 2005/0172881 A1 | * | 8/2005 | Alvarez-Calderon F. | 114/283 |
| 2007/0107646 A1 | * | 5/2007 | Alvarez-Calderon F. | 114/56.1 |

* cited by examiner

*Primary Examiner* — Timothy D Collins
*Assistant Examiner* — Medhat Badawi

(57) ABSTRACT

The aircraft is capable of two distinct fuel-efficient flight regimes: one is a vertical flight regime supported by two large two-bladed rotors with low disc loading located on right and left longitudinal booms. The booms extend between outboard regions of a front wing and inboard regions of a rear wing that has a larger span an area than the front wing. The other flight regime is high speed up to high subsonic Mach number with the aircraft supported by wing lift with high wing loading, and with the rotors stopped and faired with minimal local drag contiguous to the booms. The longitudinal location of the aircrafts center of gravity, aerodynamic center and the center of the rotors are in close proximity. The front wing is preferably swept back, and the rear wing is preferably of W planform.

9 Claims, 8 Drawing Sheets

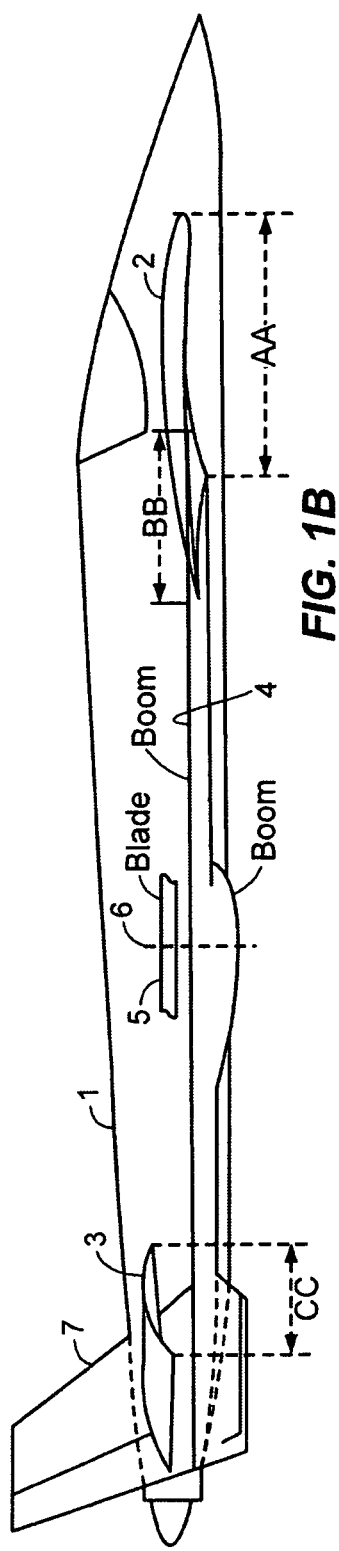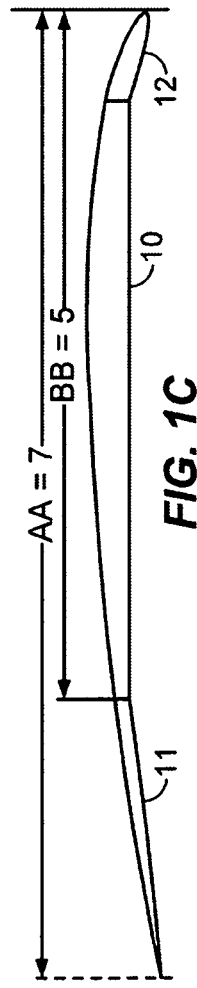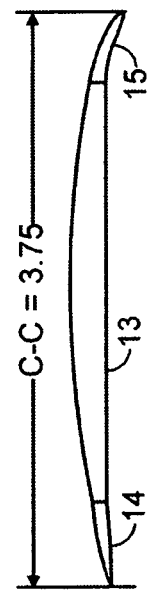
FIG. 1B
FIG. 1C
FIG. 1D

AIRCRAFT WITH DUAL FLIGHT REGIMES

CROSS REFERENCE TO RELATED APPLICATIONS

Provisional Patent Application No. 61/217,997 was filed by inventor on Jun. 4, 2009 with specifications for FIGS. 1 to 5 and several claims.

STATEMENT REGARDING FEDERALLY SPONSORED RESEARCH OR DEVELOPMENT

The present invention has no federally sponsored research and development work and is entirely privately funded.

BACKGROUND OF INVENTION

1. Field of Invention

The present invention pertains to vertical takeoff and landing aircraft (VTOL), also capable of short take off and landing (STOL), with a configuration capable of hovering with low disc loading and winged flight at a mach number near the speed of sound.

2. Prior Art

In the 1960's, and prior to that time, and after that time, various efforts have been conducted to have aircraft with wings for high speed flight capable of having vertical flight capability. Example of some configurations are the deflected slipstream approach pursued by Fairchild, the tilting wing with tilting propellers pursued by Hiller, the tail sitter VTOL attempted by Ryan, the wing tip lift jets separate from forward thrust jets pursued by Dornier, the X rotor VTOL which stopped its rotor to act as wings in forward flight, and many other configurations including the tilting ducted fans, and various forms of stoppable: rotor, stoppable rotors and convertiplanes.

After many years of efforts in the US and other countries, two aircraft technologies capable of VTOL; with STOL capability, emerged as for practical applications, exemplified in the following aircraft:

For High Speed Flight Regime:

The Harrier and Harrier II, utilizing vectored thrust of a single fan jet engine described in column 1 of table 1. It is capable of high subsonic speed of Mach 0.85, with an extremely high disc loading during vertical flight (order of 26 lb/ft 2.). As a consequence, its fuel consumption is very high during vertical flight, its range is short, and the time it can operate in vertical flight is very restricted.

For Efficient Vertical and Slow Speed Flight:

The Osprey or V-22, utilizing two rotors that can be tilted located at the extreme of a fixed wing with interconnecting shafts, described in second column of tablet. It has a very low disc loading (order of 4 lb per ft2) and therefore capable of prolonged flight in vertical mode and very low speeds. On the other hand, the high speed is limited by compressibility effects on the tips of rotors tilted forward for winged flight, and therefore its maximum forward speed is about half that of the Harrier.

Prior efforts to develop aircraft capable of a double flight regime have been attempted in the past, but they have failed in the marketplace. The design features of some of these efforts are presented in the following examples:

A single stoppable rotor, or tandem stoppable rotors, proposed for crafts with wings for higher speeds, present formidable problems in transition between rotor supported flight and wing supported flight, because of the large asymmetric forces experienced by the rotors as their rotational speed approximates zero with forward speed increases. There is also the problem on how to minimize the drag of the stopped rotor, for example by stowing the rotor in a fuselage, or leaving it exposed as in the X rotor, to act as wings. With a three bladed rotor, fairing can be accomplished by swinging backwards the three blades for high speed flight regime, which is mechanically very complex. A stopped 2 bladed rotor with the forward blade extending forwardly beyond a fuselage would encounter very high loads on the forward blade in high speed flight. This assumes that the asymmetric loads on the rotor as it approached zero RPM would have been solved, which is unlikely. Specific examples of attempts to combine vertical flight with wing lift for forward flight have been tested, for example: Vanguard Omniplane with twin motors installed inside each wing; the Fairy Rotodyne McDonnel XV-1 combining a large central rotor with fixed wings; Dornier DO31 combining multiple jets at the tip of conventional wings with a separate jet engine for forward flight; the EWR VJ 101C, the Convair XFY1 Pogo tail sitter with two large contra rotating rotors and a delta wing; the Curtiss Wright.times.100 and 1.times.19; the Dock 16 V7-4; the Bell X-22A; the Nord 500 Cadet; the tilt wings Vertol 76, Hiller X-18, and Canadian CL84. It is noted however, that the Dornier DO-31 was penalized with heavy high fuel consumption in vertical flight worse than the Harrier. All of the above attempts failed to reach production, among other reasons, for not having configurations suitable for high speed of the order of Mach 0.8, which the Harrier does have, and most of them had disc loading in hover too high for vertical flight with low fuel consumption.

BRIEF SUMMARY OF THE INVENTION

The present invention solves the problems described above and achieves a double flight regime with fuel efficiency by (a) use of long streamline booms oriented in the flight direction located outboard of the craft's center plane, supported between front and rear wings (b) two side by side rotors of large dimension relative to the weight of the craft mounted on the booms, each of two bladed type, which are counter rotating in planview in vertical and slow speed flight regimes, and therefore are capable of eliminating asymmetric forces on the aircraft as the speed of rotation approaches zero RPM when forward speed increases sufficiently, such that (c) for high speed regime, the two-bladed rotors can be stopped aligned with and contiguous the booms in a low drag disposition with the drag of the combined blades and booms minimized. The large diameter of the rotors permits los disc loading for fuel efficient vertical flight and slow flight regime, and the fairing of the stopped rotor on the booms permit the low aircraft drag that provides fuel efficiency during high speed flight regime.

BRIEF DESCRIPTION OF THE SEVERAL VIEWS OF THE INVENTION

FIG. 1 shows in half planform and side view embodiment VTOL-1 of my invention. It has a swept-back forward wing smaller than a larger rear wing with a W planform. This double wing configuration is necessary so that the center of gravity of the craft is very close to the center of lift of the rotors and to the combined aerodynamic center of the craft. This is a configuration that is neither a pure canard that should have a small front wing, nor a tandem wing which should have approximately equal spans.

Figure 7:
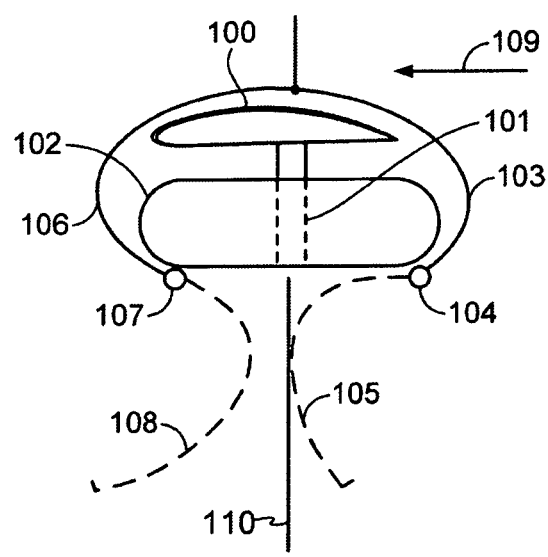

FIG. 7 pertains to a generic cross-section of the booms of my invention showing one type of longitudinal doors that enclose the stopped rotor blade in a low drag housing of the boom blade combination.

Figure 8:
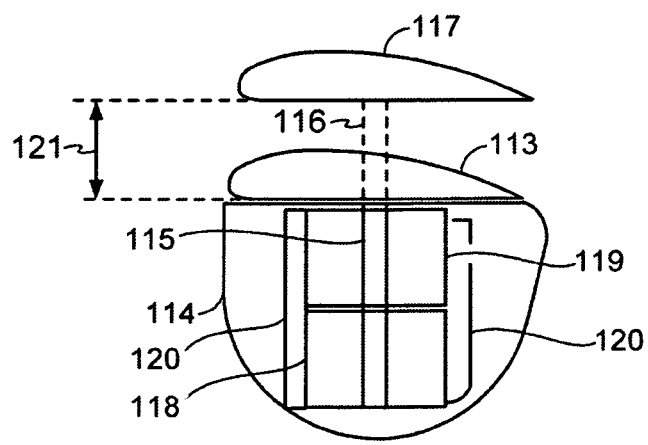

FIG. 8 shows another generic cross-section of the booms of my invention in which the rotor blades are touching the top of the booms for high speed flight regime, and are placed away and upwards from the top of the booms for vertical flight and transition.

DETAILED DESCRIPTION OF THE INVENTION

Figure 1A:
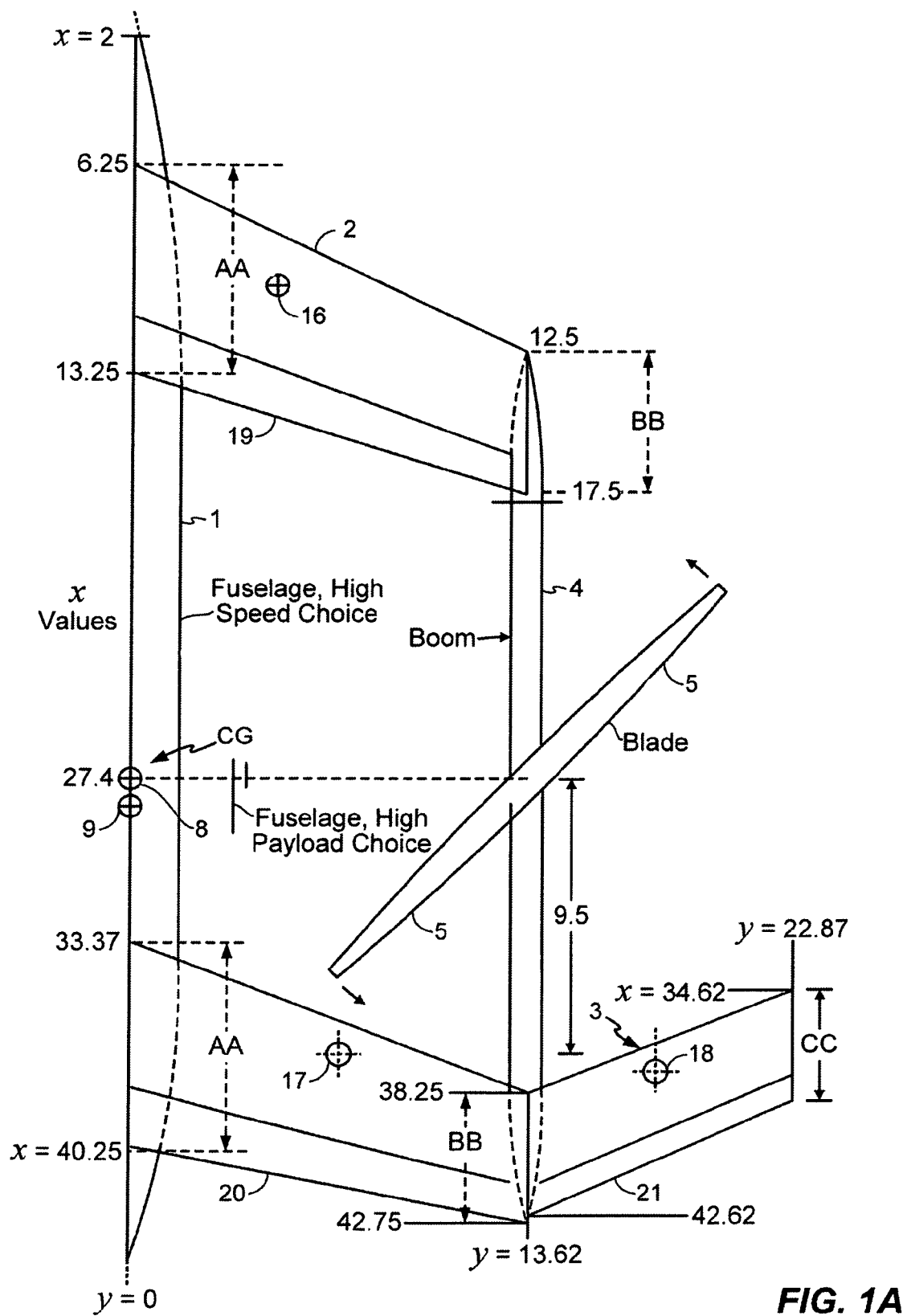

FIG. 1a shows in top view the right half of the first embodiment of my VTOL aircraft, hereafter referred to as VTOL-1, using swept wings. Specifically fuselage 1 supports a front swept-back wing 2 of small span and a rear wing with large span 3 using a W planform. A long right boom 4 extends between the tip of wing 2 and at the change of sweep of wing 3. Boom 4 supports a two bladed rotor 5 that can turn counter clockwise as shown, or clockwise. Fuselage 1 can carry a jet engine, and rotor 5 can be driven by an electric motor installed in the boom, or by an engine which can be cross-shafted to a left engine on a left boom.

In high speed flight regime, rotor blades 5 are aligned and adjacent to boom 4 for minimum drag. The blades can also be housed inside doors on the booms, as will be shown later on. The swept wings allow the craft to reach speeds of up to approximately MACH 0.85. In slow or vertical flight regime, rotor 5 and its opponents left rotor (not shown) rotate in opposite directions to generate partial lift or total lift to oppose aircraft weight, respectively, without introducing asymmetric forces.

Alignment of rotor blades with booms can use mechanical means electric-mechanical means, or magnetic means.

FIG. 1B shows in side view VTOL-1 with fuselage 1, wing 2, and wing 3 at a higher elevation than wing 2 to remove it from the wake of wing 2; also shown are boom 4 with a fairing to house an electric motor (motor not shown), and part of blade 5 with axis of rotation 6.

A fin and rudder 7 mounted at the rear end of boom 4 at the location of sweep change of rear wing 3, as part of the twin ruder component of VTOL-1.

One important feature of VTOL-1 is that its center of gravity $C_G$ shown at 8 is at, or very near, the same longitudinal location of rotor axis 6, and also at or very close to the aerodynamic center AC of the VTOL-1's planview during forward wing-sustained flight, symbolically represented by 9. It is to achieve this closely located CG, AC and rotor axis that the overall planform configuration of VTOL-1 has been developed and tested successfully.

FIG. 1C shows a sketch of airfoil section 10 used at the root of wings 2 and 3. This airfoil shows large camber for STOL flight and ease of early transition, defined by trailing edge flap 11 and leading edge flap 12.

FIG. 1D shows outer airfoil 13 adjacent the tip of wing 2 and at the change of sweep of wing 3. A much smaller trailing edge flap 14 and a relatively large leading edge flap 15 are shown. The trailing flaps at the wing's root and outboard position, when deflected as shown in the figures, generate a large washout of the wings. This prevents premature tip stall when flying at slow speeds with wing-sustained flight and also during transition. Stall is further prevented by the deflected leaning edge flap.

The airfoil shown has been tested successfully in a 4 ft model of VTOL-1. A larger craft could use a different airfoil shape, for example a NACA 64 008 at the root and a NACA 64 308 at the tip of the swept-back wing sections, together with substantial negative twist or washout in the swept back portion of both wings 2 and 3.

FIG. 1A is further characterized in having scale dimensions shown as length of fuselage on the left side of FIGS. 1a (x=2 to x=40.25 marks are shown), and as shown as span dimension at the bottom of FIG. 1a (y=13.62 and y=22.87, with y=0 at the craft's centerline). With these x and y scales, the area distribution and the moment arms between the aerodynamic centers of each wing to the center of gravity can be calculated. In the particular embodiment of FIG. 1a, which is intended for VTOL and STOL regime, the following is noted:

The area of the front wing 2 is 81 units square and the longitudinal distance between its aerodynamic center 16 to the CG at 8 is 12 units.

The area of the swept back portion of wing 3 is also 81 units square, and the longitudinal distance between its aerodynamic center 17 and the CG at 8 is 9.5 units.

The area of the swept forward portion of wing 3 is 36 units square and its longitudinal (x) distance to between its aerodynamic center 18 and the CG at 8 is 10.25 units.

In evaluating pitch equilibrium in airplane mode, the different slopes of lift curves of wings 2 or 3, and the effect of downward of wing 2 on wing 3 has to be taken into account.

The configuration shown has flow well in a radio control model with good tracking in yaw, pitch, and roll, and exceptional pitch stability in the airplane mode. Principal characteristics of the model are presented below:

The total lift area of VTOL-1 is 2(81+81+36)=2 (198)=398 square units

The ratio of front wing area to total lift area is 2(81)/396=0.41.

The ratio of total rear wing are to total wing area is 2(81+36)/396=0.59.

The product of area times distance is 2.times.81.times.16=2592 cube units for the front wing The area times distance of the rear wing is 2.times.(81+36).times.9.5=2223 cube units The slope of lift curve of the rear wing 3 increases the lift proportion with increasing angle of attack providing pitch stability.

For part of the model tests, the CG was moved slightly forward and a small amount for reasons that will be explained with reference to later figures.

The control for the craft in transition has to take into account a decreasing amount of downwash effect from the rotors on the wings as the loading of the wings increase with speed. To accomplish maximum pitch control during transition, flap 19 in front wing 2, and flaps 20 and 21 in rear wing 3, have to move in opposite direction, although theoretical calculation indicate that moving down flap 20 and 21 have good trim effect during transition. Pitch equilibrium during transitions can also be achieved with cyclic control on the rotors to oppose the pitch change due to downwash of the rotors.

Figure 2:
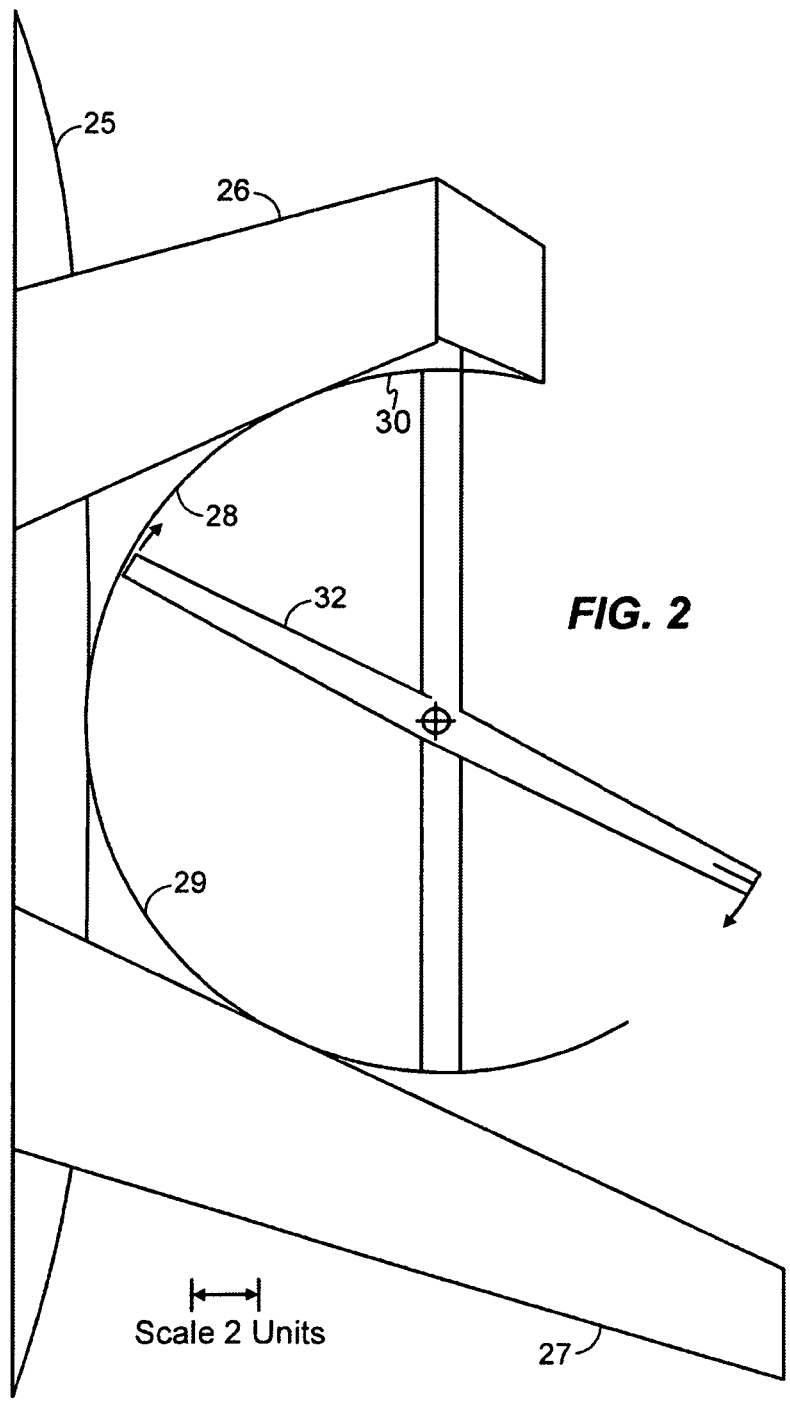
FIG. 2 shows a half embodiment VTOL-2 with a satisfactory center of gravity for both rotor and winged flight, utilizing swept forward front wing and sweptback rear wing of longer span and greater area. The wings combine with a central fuselage to provide half circular surfaces in planform around the inner portions of the circular paths of the tip of the rotors, to augment lift.

FIG. 2 shows a second embodiment of the invention referred to hereafter as VTOL-2. It is intended to augment rotor lift in vertical flight by surrounding a large portion of the perimeter of its rotors with portion of the wing and fuselage surfaces, such that the reduced pressures (lower than atmospheric) on top of the rotor's plane extends over the adjacent surfaces of the craft, as well as reducing tip losses at the tip of the blades in a large portion of its circumference.

Specifically, FIG. 2 shows a central fuselage 25, front wing 26 swept forward, and swept back wing 27. In planform the shapes of the central portion of fuselage and the adjacent trailing portion of front of wing 26 combines to form a portion of a ring 28, surrounding part of the circumference of rotor 32. The central portion of fuselage 1 and the root of the leading edge of rear wing 27 combine to form another portion of a ring 29, surrounding part of the circumference of the rotor's circle. When combined, portions 28 and 29, combines to form a surface lip covering approximately 180.degree. on the rotor's circumference providing protection against tip losses of the rotor, and inducing an extension of lower-than-atmospheric pressure region above the rotor over a substantial portion of the craft's top surface, thereby increasing lift capability.

Figure 3:
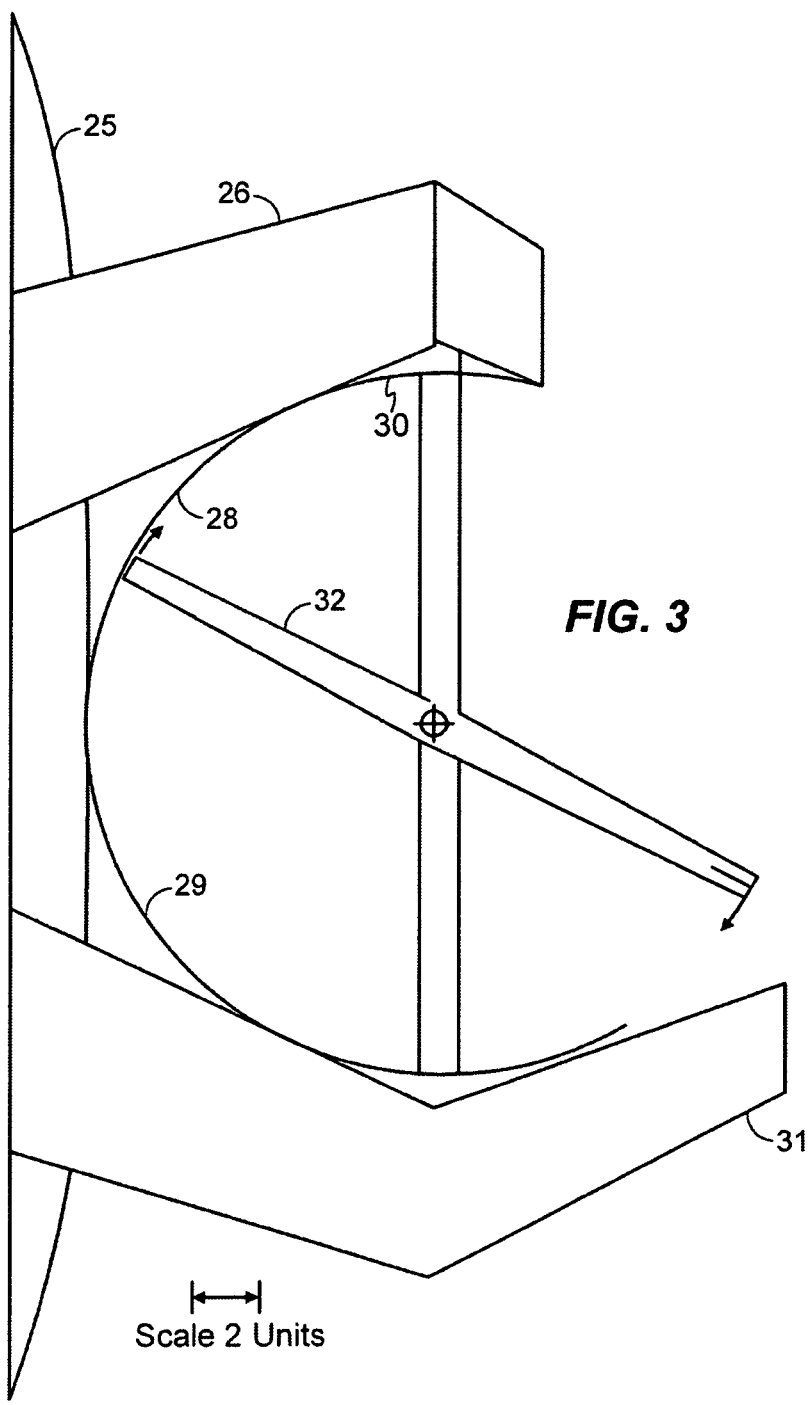
FIG. 3 shows embodiment VTOL-3 as a modification of FIG. 2 in which the rear wing uses the W planform to increase the circular surface around the rotor's periphery.

FIG. 3 is a modification of FIG. 2, comprising forward swept 31 in the outer portion of 27. This increases the total area protecting the tip losses of rotor 32 from approximately 180.degree. to approximately 120.degree., and is denoted as VTOL-3 configuration.

Figure 4:
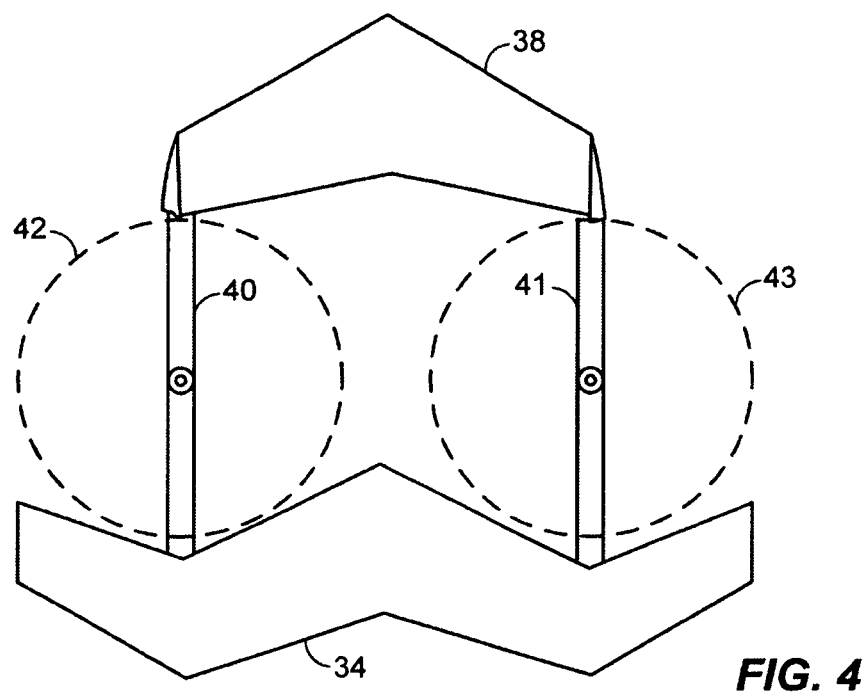
FIG. 4 shows the embodiment VTOL-4, a configuration without a central fuselage, with payloads stored in the booms, and with positive interaction between the lift of both rotors.

FIG. 4 shows a fourth embodiment of the invention, described as VTOL-4, the main feature of which is the elimination of the central fuselage shown in FIG. 1. Specifically, the type of swept back wing 38 are joined to portions of wing 39 by left boom 40 and right boom 41. The booms extend from the tip of wing 38 to the portion of wing 39 at which sweepback is reversed to form a W-planform. Two rotors are mounted on the booms shown with their peripheral paths 42 and 43.

Figure 5:
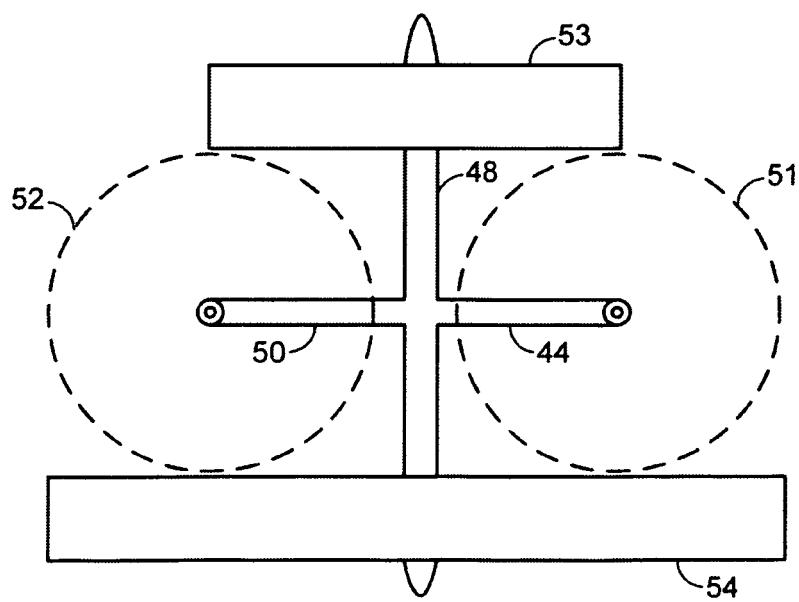
FIG. 5 shows VTOL-5 with twin rotors supported by lateral beams located between front and rear wings.

FIG. 5 shows my twin rotor configuration in an embodiment referred to as VTOL-5. It exemplifies firstly a pure helicopter configuration comprising central fuselage 48 with lateral wings or beams 49 and 50 supporting at their tips rotors having tip path 51 for the right rotor and 52 for the left rotor. This configuration offers practical advantages, such as avoiding the need of a tail rotor, or allowing the use of rigid fixed pitch rotor blades, as will be discussed later on. In a variant of FIG. 5 each rotor is asymmetric and has a single blade that could be stopped and faired below into wings 50 and 49, with airplane flight mode sustained by wings 53 and 54 for high speed flight regime.

The control of my craft of FIGS. 1 and 4 during rotor supported flight and VTOL can be accomplished by having the rotor blades governed by conventional cyclic and collective controls which are not shown here as there are well known in the art and in radio controlled models of helicopters. The control of my VTOL configurations using cyclic and collective means is reviewed below:

For vertical ascent or descent use positive or negative collective equally on both rotors.

For pitch up use cyclic control equally on both rotors such as to generate more lift in the forward quadrant of tip path of each rotor, with increased lift action ahead of the rotor shaft and ahead of the craft's CG.

For pitch down use cydic control equally on both rotors such as to generate more lift on the rear quadrant of tip path of end rotor, acting to the rear of the rotor shaft and to the rear of the craft's CG.

To roll, use differential collective, such that one rotor generates more lift and the other less lift.

Alternatively, roll can be used by single or differential use of cyclic control for example having cyclic control increase lift of one rotor on its outboard peripheral quadrant.

Figure 6C:
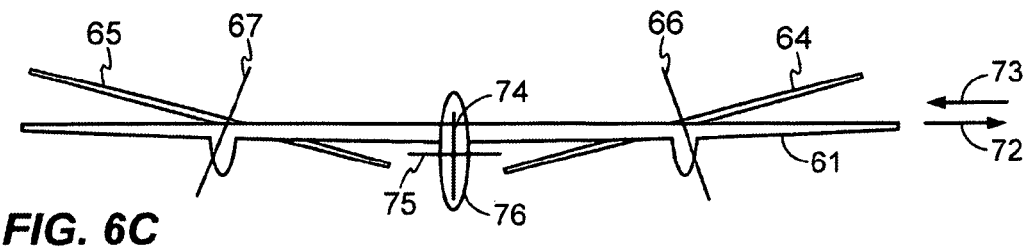
FIG. 6 shows embodiment VTOL-6 as a development of FIG. 4, comprising a forward propeller for pitch control, a rear propeller for yaw control, and a central fan jet or pusher propeller for high speed flight regime. The rotors and propellers can be powered by electric motors, especially for unmanned aircraft or by other types of engines.

Yaw control is more difficult, but it is possible by using opposite cydic control on the rotors. For example, an increase of lift on forward quadrant on the left rotor and on rear quadrant of the right rotor may generate a counter clockwise yaw seen from above. Alternatively, (a) a conventional tail rotor of a conventional helicopter can be used or (b) the booms can be equipped with vertical flaps that alter yaw equilibrium by redirecting downwash of the rotor as shown in FIG. 6G, or (c) by differential torque between the shafts of the rotors and their booms.

However, a totally difficult rotor technology is incorporated and is presented in FIG. 6 for configuration VTOL-6. Specifically, FIG. 6 shows front swept back wing 60 and rear wings 61 joined together by booms 62 and 63 as in prior embodiments. However, it differs completely from conventional rotor technology because it utilizes rotors 64 and 65 with rigid blades with fixed pitch, with rotation about rotor axis 66 and 67. Therefore VTOL-6 provides the following advantages:

It does away with the cyclic and collective controls which are of high initial cost and very high maintenance costs.

It provides large stabilizing gyroscopic effects to the vehicle provided by the large rotating rigid blades With an inward tilt of their axis of rotation, the rotating blades can provide restoring forces against side slip, as will be discussed in connection to FIG. 6C.

It permits simple roll control by differential RPM between right and left rotor

It opens up the feasibility of yaw control by differential power on rotors to generate differential torques between the shafts and the booms, or by flaps below the booms, as in FIG. 6G.

Another control feature of VTOL-6 is the pitch control provided by a simple propeller with a vertical shaft located at one longitudinal end of the craft. In the case of FIG. 6 it is shown in propeller 68 located at the nose forward body 69. This requires that the CG of the vehicle is preferably slightly ahead of the axis of the rotors. Pitch is controlled by either RPM's of a motor driven propeller 68, or by variable pitch on propeller 68, or by both.

Figure 6B:
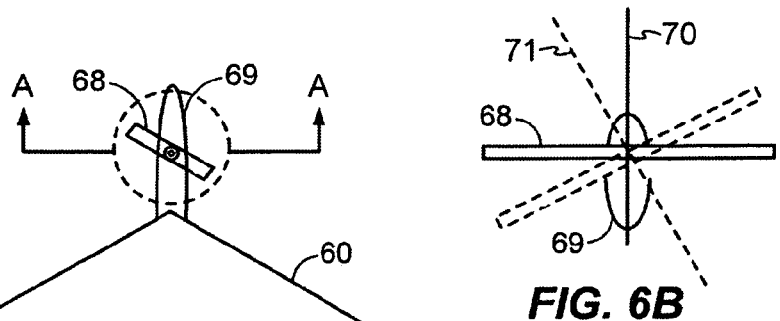

The cross-section of body 69 is shown in FIG. 6B, with one variant for yaw control: rotation axis 70 of propeller 68 can be tilted to position 71 to introduce a lateral force to control yaw. This yaw control works satisfactory as I have proven it installed in the nose of mode of FIG. 1 incorporating the tilting feature of FIG. 6B. It was found that the combined pitch and yaw control was improved by increasing propeller thrust by higher RPM, or increasing pitch as the axis of the rotation was tilted, and furthermore that thrust increase best follows a trigonometric function which had small increase of thrust with initial small tilt angle, and a much stronger increase of thrust as the tilt angle increase, i.e. a non-linear trigonometric thrust function of tilt angle.

I now refer to a unique rotor arrangement shown in FIG. 6C. Specifically, the fixed axis of rotation 66 and 67 of rotors 64 and 65 are tilted inboard such that the rotor disc is inclined inwards with a dihedral angle. This introduces an inherent correction against lateral drift. For example, a lateral drift 72 will generate a relative wind vector 73 which acts upon disc 64 with greater and opposite efficient than on rotor disc 65, and will generate a tendency for left roll and side force tending to stop the lateral drift.

Figure 6A:
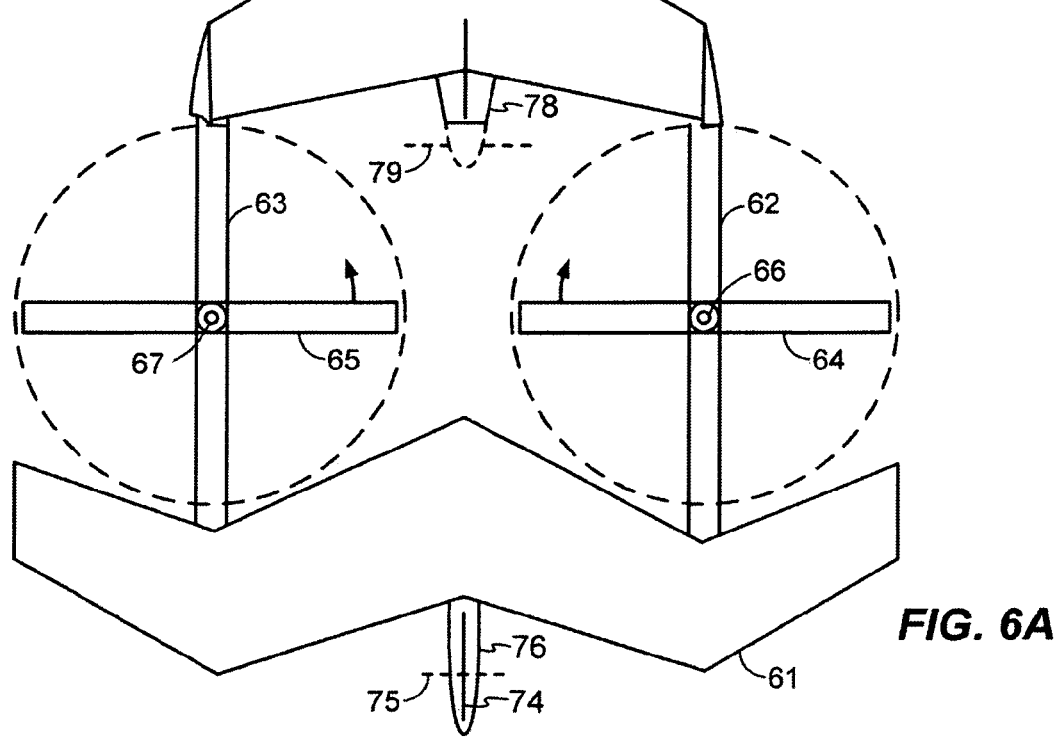

I have already discussed two methods to control yaw. A third method is shown in FIG. 6A by a rear propeller with a horizontal axis of rotation 75. With variable negative or positive pitch on the propeller, it will provide side forces for yaw control on both right and left directions. This rear propeller, when stopped in an airplane mode of flight is housed inside body 76 in a faired disposition with closed cover plates 84 and 85, in which case body 76 acts as a rear fin or rudder to provide yaw control, as is evident from the rear of FIG. 6A.

The VTOL-6 in FIG. 6A shows a power source to provide thrust for high speed flight regime, when blades 64 and 65 are stopped and a faired housed in booms 62 and 63 respectively. Specifically, FIG. 6a shows a fan jet engine 78 under the rear portion of forward wing 60. Alternatively, body 68 could have an engine driving a pusher propeller 79.

The power plants for VTOL-6 or VTOL-1 and in general for all VTOL of the invention can be internal combustion engines, or gas turbines, or electric motors.

A unique power arrangement in FIG. 6A use electric motors to drive rotors 64 and 65, with the rotor speed of a master rotor connected electronically to the rotor speed of a slave rotor. The advantage of electric motors is that it avoids the need of mechanically interconnecting shafts between the two main rotors, either by electronic means, or by the high reliability of electric motors.

The smaller propeller 68 and 74 at the longitudinal ends of the VTOL-6 can also be powered electrically. The power from the electric motors can be obtained by batteries, or by a small generator driven by an auxiliary power unit, or even diverted during vertical flight from a fan jet or gas turbine at 78 needed for thrust for high speed flight regime.

Figure 6D:
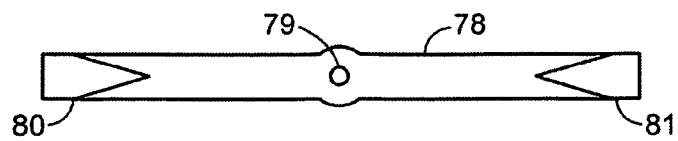

Continuing with VTOL-6, the use of rigid rotors with fixed pitch provides a stabilizing effect in roll and pitch acting as two giant gyroscopes. This effect can be further enhanced by constructing rigid blades with heavy metallic ends. For example, FIG. 6D shows rigid fixed pitch blades for the main rotor 78 that have heavy tip portions 80 and 81 that can be made of lead or downgraded heavier spent uranium. The added weight at the tips may double the gyroscopic effect of blade 78 about propeller shaft 79.

Figure 6E:
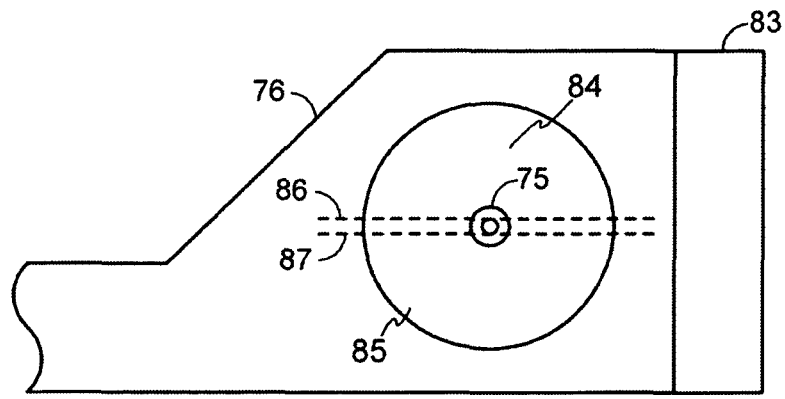

FIG. 6E shows in side view a planform detail of fin 76 with rudder 83, and the axis of rotation 75 of a propeller inside fin 76 (not shown) having a vertical plane of rotation to provide side forces for yaw control. FIG. 6E shows the high speed low drag configuration of fin 76 with the propeller 74 stationary (not shown) and with semicircular upper cover plate 84 which is hinged axis 86 in the closed high sped position. Similarly, lower plate 85 is hinged about axis 87, also in the closed position. These closed plates act as part of the aerodynamic surface portion of fin 76 in the high speed flight regime.

Figure 6F:
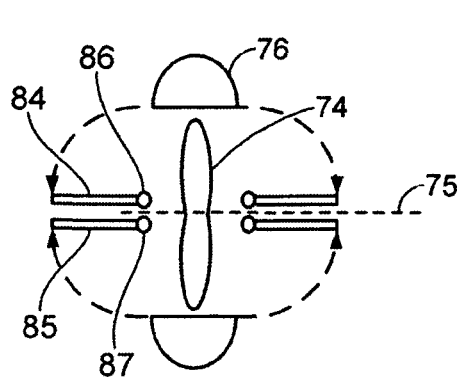
Figure 6G:
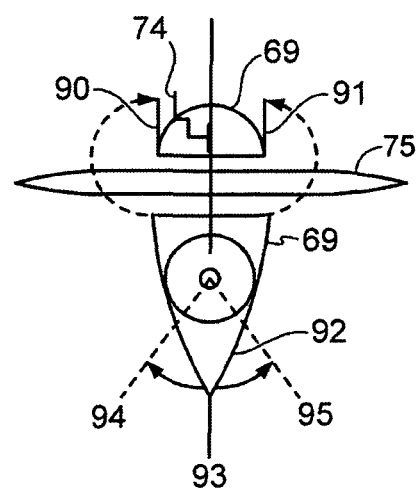

FIG. 6F is a cross-sectional view of FIG. 6E showing axis of rotation 75 of propeller 74 with doors 84 and 85 open by 90 degrees about their hinge axis 86 and 87 to the fully open position, which is needed for rotating propeller 74 to provide lateral forces by generating cross flows across the open portion of fin 76 during portions of the slow speed flight regime that require yaw control.

FIG. 6F is a yaw control alternative to FIGS. 6E and 6B. With reference to the forward nose portion of the central body in FIG. 6A, FIG. 6F shows body portion 69 on top of and below propeller 75, which rotates for combined pitch and yaw control about a fixed propeller axis 74. Side doors 90 and 91 are shown open to permit rotation of propeller 75. They close with 180 degree motion to form a surface part of body 69 for high speed flight regime. In the slow speed flight regime, propeller 75 generates a lift force for pitch control that generates a downward slipstream. Hap 92 can provide yaw control by redirecting the slipstream. For example, flap position 95, seen from the rear of the flaps, causes the VTOL vehicle of FIG. 6A to yaw to the left, and position 94 to yaw to the right.

FIG. 7 shows in cross-section one method to locate the stopped blades of my rotor contiguous to a longitudinal boom in a low drag disposition for high speed flight regime. Specifically, blade 100 is supported by its axial shaft 101 on boom 102. Blade 100 is shown in its stopped position aligned with boom 102. The low drag of the combination blade-boom is achieved by cover doors shown in closed position 103 and 106. For vertical and slow speed right regime cover door 103 is rotated about hinge 104 to position 105, and cover door 102 is rotated about its hinge 107 to position 108, such that blade 100 is free to rotate about its axis 101.

In an outboard blade position in which a blade portion moves in the direction of arrow 109, the downwash of the rotor will be downwardly from right to left. For that reason, and in order to minimize interference of the open doors with the downwash, in FIG. 7 the doors are asymmetric in respect to the vertical center line on the booms, and their open position are biased to the left.

FIG. 8 is an alternative method to provide low drag of the blade booms combination in the high speed flight regime. Specifically it shows blade 113 mounted on boom 114 by its shaft 115 such that the bottom of blade 113 is in contact and aligned with the top surface of boom 114 forming a smooth continuous surface envelope for low drag. At the bottom of shaft 115 there is an electric motor 118 driving the shaft. This motor is mounted on vertical rails 120, or equivalent mechanical support. For vertical and slow speed flight, the electric motor with its shaft is moved upwards along track 120 to position 119, elevating the blade to position 117. Blade-in position 117 is not only able to rotate under the action of its motor, but it is also able to flex downwards near its tips up to large distance 121, without touching the blades.

The large depth of boom 114 is needed only at the center of the rotor, for example as is shown at the streamlined downward protrusion at the center of boom 4 in FIG. 1B. The rest of the boom can have a smaller depth in cross-section to reduce weight and drag, as is shown in FIG. 1B. The electric motor can be moved up and down on its right and left tracks by means of an electrically powered servo mounted ahead or behind the motor, not shown for clarity.

Mechanisms for cyclic and collective control of the blades of the rotors, servos to move the flaps, servos to move the doors, servos to move the electric motors up and down on its vertical tracks, and methods to construct the wings and booms are not shown in the specifications, because they are known in the art, and such mechanisms, hinges, selection of servos, and their corresponding controls systems can be designed by aeronautical and electronic engineers.

The flight characteristics in vertical and slow speed flight of my VTOL vehicle can be enhanced considerably by having gyros detect motions in roll, yaw, and pitch and implement commands that vary the RPM of rotors and propellers, and/or that angle of attack of their blades for smooth flight. Alternatively, accelerometers in the vertical direction can be used to detect and diminish undesirable motions through their action on RPM of rotors and propellers, or their blade angles. Information on such means for improving stability in vertical flight and transition area available in the literature, for example, as reported for helicopters in several model airplane magazines.

Variations and changes can be made on my invention without departing from the spirit of the invention, within the scope of the clauses of this application.

TABLE 1

FOR PATENT APPLICATION OF "AIRCRAFT WITH DUAL FLIGHT REGIME"

| Aircraft Type | Harrier II | V-22 Osprey |
|---|---|---|
| Weight, lbs | | |
| STOL | 31,000 | 55,000 |
| VTOVL | 20,595 | 47,500 |
| VL | 19,937 | ? |
| Powerplant | | |
| Make | Rolls Royce | 2 Allison |
| Rating | 21,450 lbs ST | 6150 HP |
| Overall Dimensions, ft | | |
| Overall span | 30.4 | 50.9 |
| Length | 46 | 57.4 |
| Height | 11.6 | 17.4 |
| Speed | | |
| Max knots | 575 | 275 SL |
| Max, MACH | 0.87 | Low |
| Cruise | ? | ? |
| Endurance | ? | ? |
| Disc load, lb/ft | 1638 | 21 |

I claim:

1. An aircraft capable of rotor sustained vertical flight and wing sustained horizontal flight, said aircraft comprising:
    a front wing with a planform area, a wing span, and backward sweep;
    a rear wing featuring
        a wing span
        a W-shaped leading edge and a W-shaped trailing edge, said leading edge and trailing edge defining a W-shaped plan form,
        wherein area of the W-shaped plan form is larger than the area of said plan form of the front wing, a wing span that is larger than the wing span of the front wing,
        wherein the wing span of the rear wing is larger than the wing span of the front wing;
    a first streamlined body that (a) is longitudinally oriented between the front and rear wings and (b) supports a first rotor;
    a second streamlined body that (a) is longitudinally oriented between the front and rear wings and (b) supports a second rotor;
    said first and second stream lined bodies located on lateral portions of said front and back wings; and,
    said first and second streamlined bodies having a longitudinal length between said front and back wings, wherein said first and second rotors feature a diameter approximately equal to the longitudinal length of said first and second streamlined bodies.

2. The aircraft of claim 1 wherein:
    said front wing is swept forward;
    said rear wing is swept backwards; and,
    the planform area of the front wing is substantially smaller than the planform area of the rear wing.

3. The aircraft of claim 1 further comprising a central fuselage between said streamlined bodies, and wherein the lift sustained by each of said rotors during vertical flight is approximately half of the weight of said aircraft.

4. The aircraft of claim 3 wherein the planform area of said rear wing is substantially larger than the planform area of the front wing, and wherein the longitudinal positions of (i) the center of gravity of said aircraft, (ii) the aerodynamic center of said aircraft, (iii) the axis of rotation of said first rotor, and the axis of rotation of said second rotor are in close proximity to alignment.

5. The structure of claim 3 further characterized in having blades of said first and second rotors with fixed pitch and free of articulations.

6. The aircraft of claim 1 further characterized in that said streamlined bodies have longitudinal structural beams that support large lift forces of said rotors, with external fairing surfaces hinged at the bottom surface of said beam and adapted to be moved from a first position clear of the path of said rotors when in operation in vertical flight regime, and a second position enclosing said rotors when stopped in a low drag disposition in high speed regime.

7. The aircraft of claim 2 with a front portion of said first and second streamlined bodies being attached to said front wings adjacent to different tips of said front wings, and with a rear portion of said streamlined bodies attached to different portions of said rear wings at a locations adjacent the changes of sweep of the W planform of said rear wing.

8. The aircraft of claim 2, further wherein portions of said wings in planform and portions of said central fuselage in planform form a circular ring portion with lips that are contiguous to portions of the circular paths of the tip of said rotors, with the radius of said circular ring portion and said lips being substantially equal to the radius of said rotors for minimal gap there between, said ring portion and lips being free of rectilinear segments in planform, to induce lifting forces by extending the low pressures inherent in top of the rotors when in vertical flight on said contiguous lips and on part of the surfaces of said wings and said fuselage, which are adjacent to said lips, and to the top surface of said aircraft between said rotors.

9. An aircraft capable of operating in rotor sustained vertical flight and in wing sustained high speed horizontal flight, said aircraft comprising:
    a front wing with a front wing span;
    a rear wing with a span that is larger than said front wing span;
    two longitudinal streamlined bodies attached to lateral portions of said wings, said streamlined bodies having a longitudinal length between said wings, with each of said longitudinal bodies supporting a rotor, and with the diameters of said rotors being approximately equal to said longitudinal length of said streamlined bodies between said wings;
    wherein each of said rotors having two blades that are adapted to be permanently stopped during high speed wing-sustained flight with their long dimension parallel and in close proximity to, and aerodynamically faired with said longitudinal bodies in a low drag disposition;
    wherein said front wing features backward sweep, and said rear wing features a trailing edge and a leading edge each having a W shaped planform with a rear wing area larger than the area of said front wing; and,
    wherein said aircraft center of gravity, an aerodynamic center, and axis of rotation of each of said rotors with longitudinal positions that are in close proximity to alignment.

* * * * *